(12) United States Patent
Inada et al.

(10) Patent No.: US 7,444,232 B1
(45) Date of Patent: Oct. 28, 2008

(54) KNOCK CONTROL APPARATUS FOR INTERNAL COMBUSTION ENGINE

(75) Inventors: Takahiko Inada, Tokyo (JP); Kimihiko Tanaya, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 11/945,071

(22) Filed: Nov. 26, 2007

(30) Foreign Application Priority Data

May 11, 2007 (JP) .............................. 2007-126850

(51) Int. Cl.
*F02P 1/00* (2006.01)
(52) U.S. Cl. ..................................... 701/111; 73/35.08
(58) Field of Classification Search ................. 701/111; 73/35.08; 123/406.21, 406.38
See application file for complete search history.

(56) References Cited

U.S. PATENT DOCUMENTS 6,439,029 B2* 8/2002 Asano et al. ............... 73/35.08
6,561,163 B1* 5/2003 Takahashi et al. ......... 123/406.21
6,748,922 B2* 6/2004 Uchida et al. .............. 73/35.08

FOREIGN PATENT DOCUMENTS

JP 06-147079 B2 5/1994
JP 10-009108 A 1/1998

* cited by examiner

*Primary Examiner*—Hieu T Vo
(74) *Attorney, Agent, or Firm*—Sughrue Mion, PLLC (57) ABSTRACT

A knock control apparatus for an internal combustion engine can avoid an incorrect knock determination thereby to prevent output power reduction and suppress knocks occurring in succession. A knock detection section outputs a knock detection signal based on an ionic current, and a threshold setting section sets a knock determination threshold. A knock determination section determines the occurrence of a knock based on the threshold and the knock detection signal. A required correction amount setting section sets a required correction amount for ignition timing based on a knock determination result, and a control parameter correction section corrects ignition timing based on the required correction amount. A noise determination section determines the occurrence of noise based on whether said knock detection signal or said control parameter correction amount is within a set level range, and a noise removal period setting section sets a noise removal period based on the noise determination result.

4 Claims, 5 Drawing Sheets

| KPLS | Rtable |
|------|--------|
| 0    | 0.0    |
| 3    | 0.4    |
| 6    | 0.8    |
| 9    | 1.2    |
| 12   | 1.6    |
| 15   | 2.0    |
| 18   | 2.4    |
| 21   | 2.8    |
| 24   | 3.2    |

| RTD | NH | NL |
|-----|------|------|
| 0 | 4.0 | 2.0 |
| 1 | 6.0 | 3.0 |
| 2 | 8.0 | 4.0 |
| 3 | 10.0 | 5.0 |
| 4 | 12.0 | 6.0 |
| 5 | 14.0 | 7.0 |
| 6 | 16.0 | 8.0 |
| 7 | 18.0 | 9.0 |
| 8 | 20.0 | 10.0 |
| 9 | 22.0 | 11.0 |
| 10 | 24.0 | 12.0 |

KNOCK CONTROL APPARATUS FOR INTERNAL COMBUSTION ENGINE

BACKGROUND OF THE INVENTION

1. Field of the Invention

The present invention relates to a knock control apparatus for an internal combustion engine which detects knocking (hereinafter abbreviated as a "knock") of the internal combustion engine based on an amount of ions (ionic current) generated upon combustion of the internal combustion engine, and corrects control parameters (ignition timing, etc.) of the internal combustion engine in a direction to suppress the knocking.

2. Description of the Related Art

In general, in internal combustion engines, a mixture of air and fuel introduced into a combustion chamber of each cylinder is compressed by an ascending movement of a piston received therein, and in an explosion stroke, the compressed mixture is fired and combusted by a spark on a spark plug which is generated by impressing a high voltage to the spark plug in the combustion chamber, whereby explosion energy at this time is taken out as a depression force of the piston and is converted into a rotational output.

When combustion is performed in the combustion chamber of each cylinder in the explosion stroke, molecules of the mixture in the combustion chamber are electrically dissociated (ionized), so when a high voltage is impressed, immediately after the explosion stroke, to electrodes for detection of an ionic current which are installed in the combustion chamber, ions with electric charge thus generated flow as an ionic current. In addition, it is known that the ionic current changes sensitively in accordance with the combustion state of the combustion chamber, and hence, the combustion state (occurrence of a misfire or a knock) in the cylinder can be determined by detecting the state of the ionic current.

Accordingly, there has conventionally been proposed an apparatus that can detect the occurrence of a knock in an internal combustion engine by detecting the state of an ionic current (see, for instance, a first patent document: Japanese patent application laid-open No. H10-9108).

In such a known knock control apparatus for an internal combustion engine described in the above-mentioned first patent document, a frequency band corresponding to the knock is extracted from the ionic current as a knock signal by means of a band-pass filter, and the knock signal is compared with a predetermined level to provide knock pulses, based on the number of which it is determined whether knocking has occurred.

In case where in the ionic current there occurs noise which has a frequency approximate to that of a knock and is able to pass through the bandpass filter, pulses corresponding to the noise are generated and detected, in view of which the number of the pulses thus detected is averaged to obtain an average number of pulses, which is subtracted from the number of knock pulses to provide a number of pulses corresponding to the knock, by which a control amount of retard angle is increased.

In addition, there has also been proposed an apparatus that is constructed so as to avoid noise generated upon seating of engine operating valves when vibration generated upon occurrence of a knock is detected by a knock sensor (see, for example, a second patent document: Japanese patent application laid-open No. H6-147079).

In the knock control apparatus for an internal combustion engine described in the above-mentioned second patent document, a first detection knock signal, when being within a set level range, is assumed to be valve seating noise, and by focusing attention on a cylinder for which the knock detection signal was obtained, a reoccurrence detection period timer is started to be driven from that point in time for counting a predetermined period Ts that is preset so as to detect the recurrence of noise. When the following knock detection signal, being within the set level range, is detected from the same cylinder before the reoccurrence detection period timer completes the counting of the period Ts, the knock detection signal is determined as valve seating noise and retard angle processing corresponding to the knock is cancelled.

It is known that noise of the same vibration component as a knock frequency might sometimes be superposed on the ionic current, depending upon the operating state of the internal combustion engine, in spite of the non-occurrence of a knock.

In addition, it is also known that in some engines, the pressure in a cylinder is sometimes caused to pulsate without regard to the occurrence of a knock, so a vibration component might be superposed on the waveform of an ionic current in accordance with the generation of such pressure pulsation. Further, the pulsating noise due to the cylinder internal pressure is misjudged as the occurrence of a knock, so ignition timing is correctively set to a retard angle side, and the supply of fuel is also correctively set to a rich side, as a result of which it is experimentally known that the frequency of occurrence of pulsating noise and the amplitude strength of vibration thereof both tend to increase.

With the conventional knock control apparatuses for an internal combustion engine, in case where a knock vibration component is extracted by using a band-pass filter as described in the above-mentioned first patent document, there is a problem that noise with the same frequency component as a knock frequency of a knock is not able to be distinguished from the knock.

Moreover, there is another problem as stated below. That is, it is very difficult to extract only a knock signal on which a noise component with a vibration amplitude strength and a vibration duration that are comparable with the detection level of a large knock upon occurrence thereof is superposed, which becomes an obstacle to the development of a knock detection apparatus particularly using an ionic current detection system.

Also, in the case of avoiding pulsating noise of cylinder internal pressure as in the second patent document, ignition timing need be correctively set to a retard angle side, and the supply of fuel need also be correctively set to a rich side due to the pulsating noise, so the frequency of occurrence of pulsating noise and the amplitude strength of vibration thereof both tend to increase. As a result, there exists noise, such as seating noise of valves of the valve operating system of the engine, which does not fall into the set level range for masking, and hence there is a problem that it is after all impossible to avoid the incorrect detection of pulsating noise.

Further, when a subsequent knock detection signal, being within the set level range, is detected from the same cylinder, it is mistakenly determined that the knock detection signal is valve seating noise, and retard angle correction processing for ignition timing is canceled in spite of a knock occurrence state, so there is a problem that it is impossible to suppress knocks occurring in succession.

SUMMARY OF THE INVENTION

Accordingly, the present invention is intended to obviate the problems as referred to above, and has for its object to obtain a knock control apparatus for an internal combustion engine which is capable of avoiding an incorrect knock determination under a condition in which noise might occur, thereby to prevent falling into a vicious circle in which noise is further increased due to the retard angle correction of ignition timing based on the incorrect knock determination, of preventing the trouble of causing reduction in output power due to successive retard angle corrections of ignition timing based on the incorrect knock determination, and of suppressing knocks occurring in succession.

Bearing the above object in mind, a knock control apparatus for an internal combustion engine according to the present invention includes: a knock detection section that evaluates an ionic current generated upon combustion of a mixture around a spark plug of the internal combustion engine and outputs a knock detection signal; a threshold setting section that sets a knock determination threshold for the knock detection signal; a knock determination section that determines the presence or absence of a knock based on the threshold and the knock detection signal; a required correction amount setting section that sets an amount of correction for a control parameter including at least ignition timing based on a determination result of the knock determination section; a control parameter correction section that sets a control parameter correction amount based on the required correction amount and corrects the control parameter; a noise determination section that determines the presence or absence of noise based on whether at least one of the knock detection signal and the control parameter correction amount is within a set level range; and a noise removal period setting section that sets a noise removal period based on a determination result of the noise determination section. The noise removal period setting section starts a noise removal period timer when it is determined that at least one of the knock detection signal and the control parameter correction amount is within the set level range. The noise removal period setting section inhibits correction processing of the control parameter correction section for a period of time in which a timer value of the noise removal period timer is less than a predetermined value, and permits the correction processing when the timer value reaches the predetermined value.

According to the present invention, it is possible to avoid an incorrect knock determination under a condition in which noise might occur, thereby to prevent falling into a vicious circle in which noise is further increased due to the retard angle correction of ignition timing based on the incorrect knock determination. In addition, it is also possible to prevent the trouble of causing reduction in output power due to successive retard angle corrections of ignition timing based on the incorrect knock determination, and knocks occurring in succession can be suppressed.

The above and other objects, features and advantages of the present invention will become more readily apparent to those skilled in the art from the following detailed description of a preferred embodiment of the present invention taken in conjunction with the accompanying drawings.

DESCRIPTION OF THE PREFERRED EMBODIMENTS

Hereinafter, a preferred embodiment of the present invention, in which the invention is applied, by way of example, to a four-cylinder engine, will be described while referring to the accompanying drawings.

Embodiment 1

Figure 1:
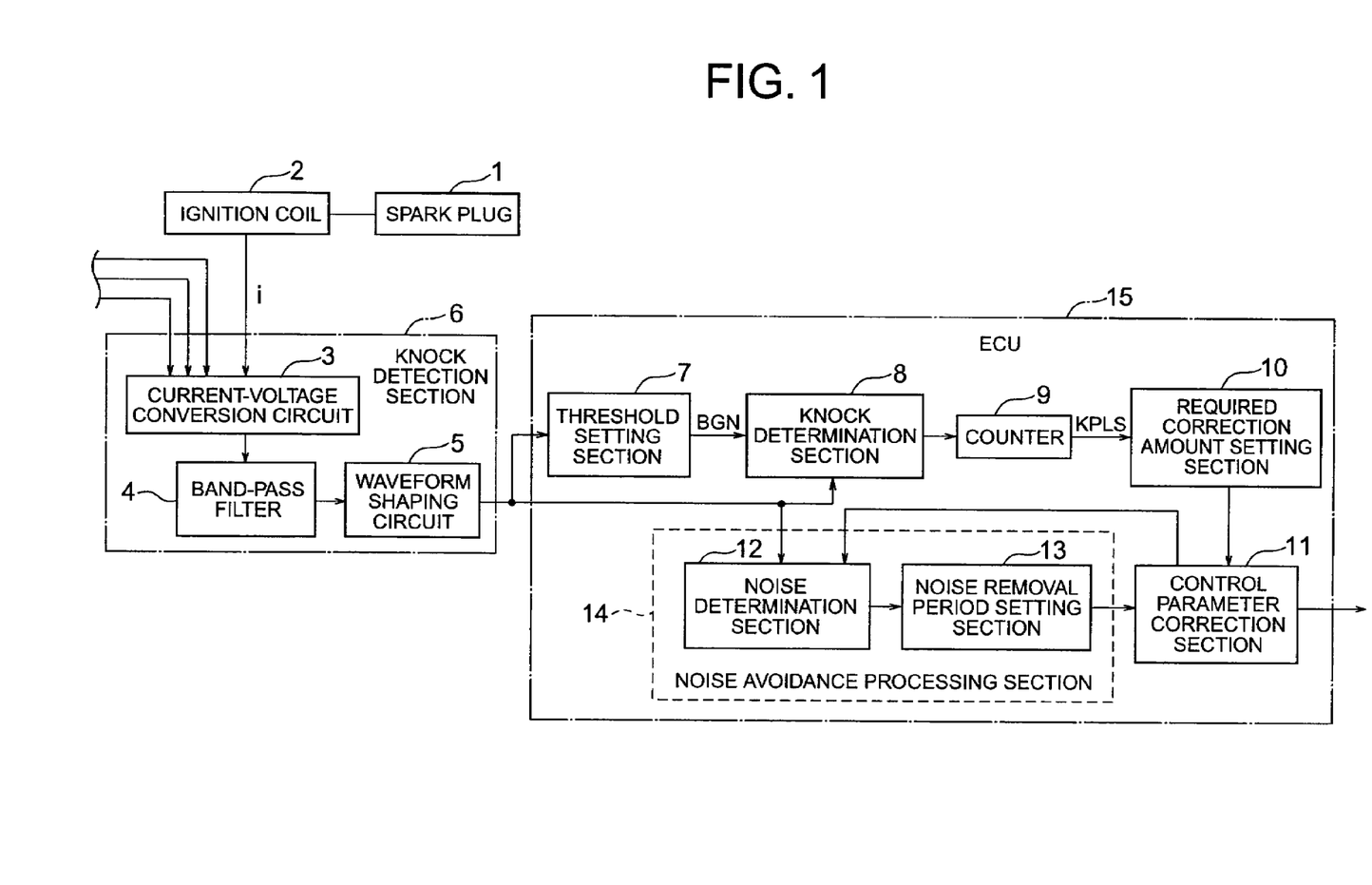
FIG. 1 is a block diagram schematically showing a knock control apparatus for an internal combustion engine according to a first embodiment of the present invention.

Referring to the drawings and first to FIG. 1, there is schematically shown, in a block diagram, a knock control apparatus for an internal combustion engine according to a first embodiment of the present invention.

In FIG. 1, the knock control apparatus for an internal combustion engine includes a knock detection section 6 that has a spark plug 1 and an ignition coil 2 and is connected to the internal combustion engine (hereinafter also referred to as an engine), and an ECU 15 (engine control unit) that is connected to the knock detection section 6.

The spark plug 1 is connected to the ignition coil 2 and is disposed in a combustion chamber of the internal combustion engine, so that upon de-energization of the ignition coil 2, a high voltage is impressed to the spark plug 1 thereby to generate a discharge spark to fire or combust an air fuel mixture in the combustion chamber. In addition, in order to detect ions generated around the spark plug 1 during the combustion of the mixture, the ignition coil 2 has a bias voltage for detection of an ionic current.

The knock detection section 6 includes a current-voltage conversion circuit 3 that converts an ionic current i detected through the ignition coil 2 into a current-voltage signal, a band-pass filter 4 that extracts a knock signal from the ionic current signal output from the current-voltage conversion circuit 3, and a waveform shaping circuit 5 that generates a knock pulse (knock detection signal) by comparing the knock signal from the band-pass filter 4 with a predetermined level.

As a result, the knock detection section 6 evaluates the ionic current i generated upon the combustion of the mixture around the spark plug 1, and outputs the knock pulse as a knock detection signal.

Here, not that the spark plug 1 and the ignition coil 2 for only one of four cylinders are representatively shown, but ionic currents from ignition coils for the other three cylinders are also input to the current-voltage conversion circuit 3 (see an arrow in FIG. 1).

The ECU 15 includes a threshold setting section 7, a knock determination section 8, a counter 9, a required correction amount setting section 10, a control parameter correction section 11, a noise avoidance processing section 14 that comprises a noise a determination section 12 and a noise removal period setting section 13, and unillustrated other calculation units.

The threshold setting section 7 sets a threshold BGN for the knock pulse based on the knock pulse (knock detection signal) from the waveform shaping circuit 5.

The knock determination section 8 determines the presence or absence of a knock by comparison of the knock pulse with the threshold BGN, and outputs the knock pulse larger than or equal to the threshold BGN as a knock pulse after knock determination result.

The counter 9 counts the number of knock detection pulses KPLS from the knock determination section 8 at each ignition cycle.

The required correction amount setting section 10 sets a required amount of correction for each of control parameters (an amount of retard angle control) including at least ignition timing based on the number of knock detection pulses KPLS corresponding to the knock determination result.

The control parameter correction section 11 sets a correction amount of a control parameter based on at least a required amount of correction (e.g., and an amount of increase of retard angle control) from the required correction amount setting section 10, and corrects the control parameter (e.g., ignition timing).

The noise determination section 12 in the noise avoidance processing section 14 determines the presence or absence of noise in the knock pulse based on whether at least one of the knock pulse and the control parameter correction amount is within a set level range. For example, as will be described later, the noise determination section 12 determines, based on a current number of input pulses NPLS[Cyl] from the knock detection section 6 as a knock detection signal, whether the number of input pulses NPLS[Cyl] is within the set level range.

In addition, the noise determination section 12 variably sets the set level range for the noise determination in accordance with the control parameter correction amount.

The noise removal period setting section 13 has a noise removal period timer, and sets the noise removal period for the control parameter correction section 11 based on the determination result of the noise determination section 12.

Specifically, when the noise determination section 12 determines that at least one of the knock pulse and the control parameter correction amount is within the set level range, the noise removal period setting section 13 starts the noise removal period timer, and at the same time, it inhibits the correction processing of the control parameter correction section 11 for a period in which the value of the noise removal period timer (hereinafter also referred to as the "timer value") is smaller than a predetermined value, whereas it permits correction processing of the control parameter correction section 11 when the timer value reaches the predetermined value.

In addition, after start of the noise removal period timer, the noise removal period setting section 13 permits correction processing over a predetermined number of times within a predetermined time after the timer value reaches the predetermined value.

Further, when at least one of the knock pulse and the control parameter correction amount deviates from the set level range after start of the noise removal period timer, the noise removal period setting section 13 permits correction processing regardless of the timer value.

Next, reference will be made to the operation of this first embodiment of the present invention, as shown in FIG. 1.

The ignition coil 2 detects the ionic current i flowing through the spark plug 1 and supplies it to the current-voltage conversion circuit 3. In this connection, note that the detected values of other ionic currents are supplied from individual ignition coils (not shown) corresponding to the other cylinders to the current-voltage conversion circuit 3.

The ionic current signal generated from the current-voltage conversion circuit 3 is turned into a knock signal through the band-pass filter 4, and is further compared with a predetermined level in the waveform shaping circuit 5 to be turned into a knock pulse, which is then supplied to the threshold setting section 7, the noise determination section 8 and the noise determination section 12 in the ECU 15.

The counter 9 in the ECU 15 counts the number of knock detection pulses KPLS at each ignition cycle, and inputs it to the required correction amount setting section 10 and other calculation units in the ECU 15.

Here, note that the first embodiment of the present invention is not limited to the construction example of FIG. 1, and like other constructions may also be employed. For example, in FIG. 1, in the knock detection section 6, a knock signal is compared with the predetermined level to provide a waveform shaped knock pulse, and the number of knock detection pulses KPLS obtained by the counter 9 is used as knock information, but an integral value, a peak value, etc., of the knock signal at each ignition may be used as knock information. In addition, the ionic current signal or the knock signal may be converted from analog into digital form at a predetermined period, and input to an FFT calculation unit (not shown) in the ECU 15, so that the result of FFT calculation may be used as knock information.

Now, reference will be made to knock determination processing operation of the ECU 15 in FIG. 1 while referring to a flow chart in FIG. 2 and an explanatory view in FIG. 4.

Figure 2:
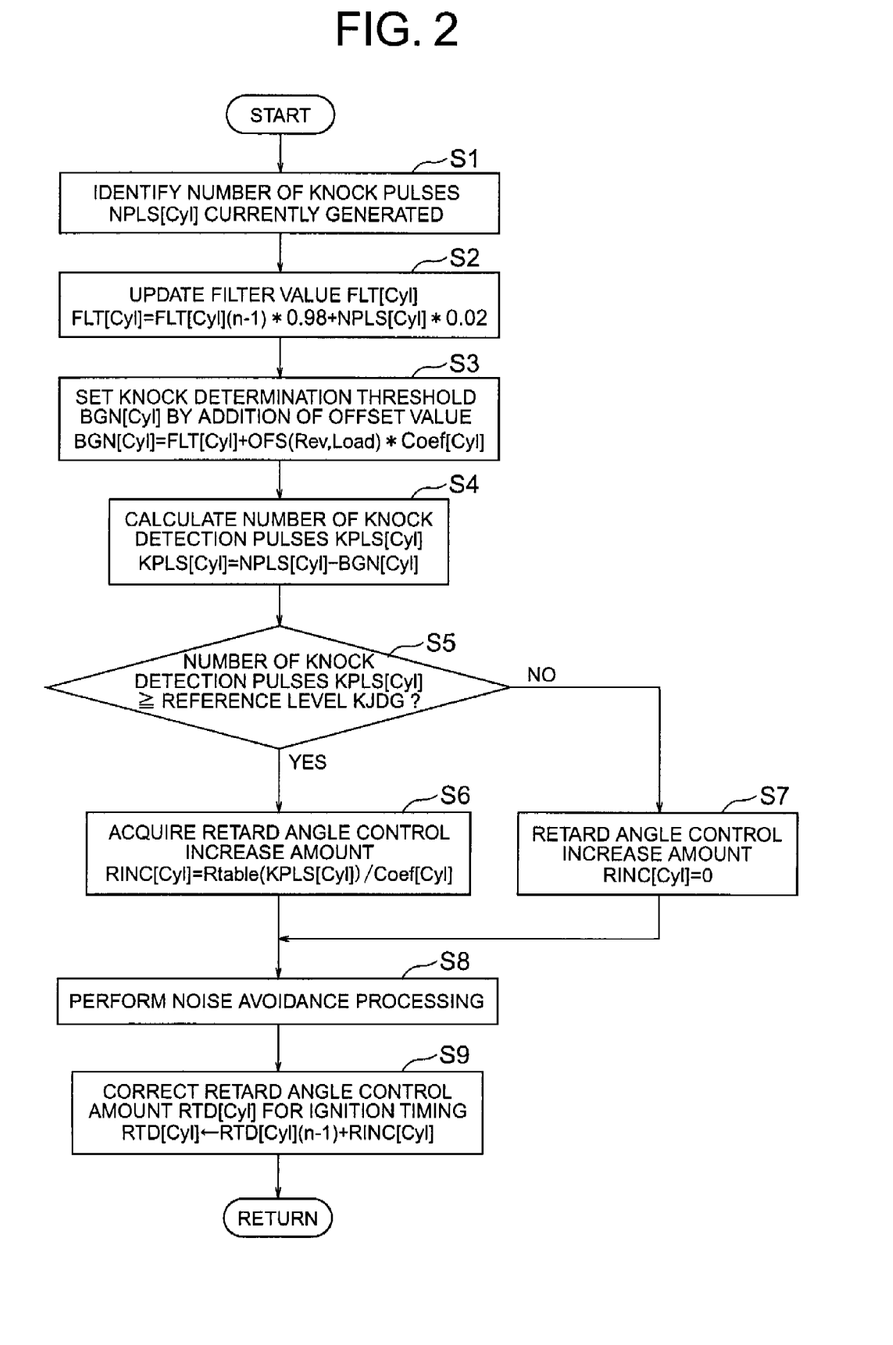
FIG. 2 is a flow chart illustrating a knock determination operation according to the first embodiment of the present invention.

Here, note that steps S2, S3 in FIG. 2 correspond to the processing of the threshold setting section 7, and step S4 corresponds to the processing of a knock determination section 8, the counter 9 and the noise determination section 12. Also, steps S5 through S7 correspond to the processing of the control parameter required correction amount setting section 10, and step S8 corresponds to the processing of the noise avoidance processing section 14, and step S9 corresponds to the processing of the control parameter correction section 11.

In FIG. 2, first of all, the ECU 15 identifies the number of knock pulses currently generated from the knock detection section 6 as an input pulse number NPLS[Cyl] for each cylinder (Cyl) (step S1).

Subsequently, the threshold setting section 7 in the ECU 15 updates, as shown in the following expression (1), a current filter value FLT[Cyl], which becomes a part of the knock determination threshold BGN, by using the last filter value FLT[Cyl] (n−1) and the current number NPLS of input pulses (step S2).

$$FLT[Cyl] = FLT[Cyl](n-1) \times 0.98 + NPLS[Cyl] \times 0.02 \quad (1)$$

In expression (1) above, the current filter value FLT[Cyl] is obtained as a sum of 98% of the last filter value FLT[Cyl] (n−1) of the cylinder concerned and 2% of the current number of input pulses NPLS, but other arbitrary filter calculation methods can be used. In addition, it may be possible to apply processing not to update the filter value when it is determined the presence or occurrence of knock.

Then, the threshold setting section 7 generates a knock determination threshold BGN[Cyl] based on the level of the knock detection signal, as shown in the following expression (2), by adding an offset value OFS(Rev, Load) to the filter value FLT[Cyl] (step S3).

$$BGN[Cyl] = FLT[Cyl] + OFS(Rev, Load) \times Coef[Cyl] \quad (2)$$

where a correction coefficient Coef[Cyl] is a set value which is weighted for each cylinder, and the offset OFS(Rev, Load)

is acquired by a map value set at least for each pair of the number of engine revolutions per minute (Rev) and the engine load (Load).

Subsequently, the knock determination section 8 calculates the number of pulses corresponding to the knock by subtracting the knock determination threshold BGN[Cyl] from the current number of input pulses NPLS[Cyl]. The counter 9 counts pulses from the knock determination section 8, and obtains the number of knock detection pulses KPLS[Cyl] for each cylinder, as shown in the following expression (3) (step S4).

$$KPLS[Cyl]=NPLS[Cyl]-BGN[Cyl] \quad (3)$$

Thereafter, the required correction amount setting section 10 compares the number of knock detection pulses KPLS[Cyl] obtained in step S4 with a knock determination reference level KJDG, and determines whether the number of knock detection pulses KPLS[Cyl] is larger than or equal to the reference level KJDG (step S5).

When it is determined as KPLS[Cyl]<KJDG in step S5 (that is, NO), the required correction amount setting section 10 assumes that the engine is in a non-knocking state, and sets an amount of increase in the retard angle control of ignition timing (hereinafter referred to as an "ignition timing retard angle control increase amount) RINC[Cyl] to zero (step S7), after which the control flow proceeds to noise avoidance processing (step S8).

On the other hand, when it is determined as KPLS[Cyl]≧ KJDG in step S5 (that is, YES), the required correction amount setting section 10 assumes that the engine is in a knocking state, and calculates the ignition timing retard angle control increase amount RINC[Cyl], as shown in the following expression (4), by using the retard angle control basic increase amount (conversion table value) Rtable (KPLS[Cyl]) corresponding to the number of knock detection pulses KPLS[Cyl] and the correction coefficient Coef[Cyl] (step S6).

$$RINC[Cyl]=Rtable(KPLS[Cyl])/Coef[Cyl] \quad (4)$$

Figure 3:
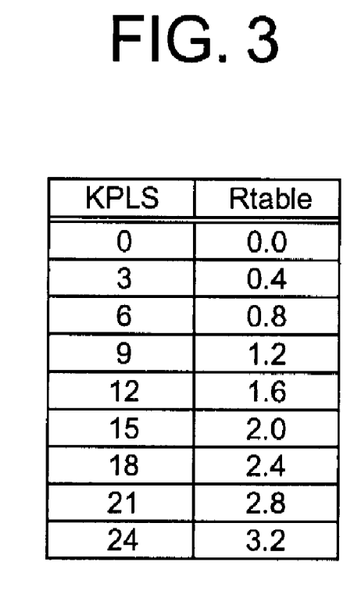
FIG. 3 is an explanatory view showing conversion table values for retard angle control basic increase amount with respect to a knock detection pulse in the first embodiment of the present invention.

As shown in expression (4) above, the final retard angle control increase amount RINC[Cyl] becomes a value that is obtained by dividing the retard angle control basic increase amount (conversion table value) Rtable[Cyl] of FIG. 3 by the correction coefficient Coef[Cyl].

Here, note that the ignition timing retard angle control basic increase amount (conversion table value) Rtable (KPLS[Cyl]) is set in accordance with the number of knock detection pulses KPLS[Cyl], for example as shown in FIG. 3.

FIG. 3 shows one example of a conversion table from the number of knock detection pulses KPLS[Cyl] to the retard angle control basic increase amount Rtable (KPLS[Cyl]), but as is clear from FIG. 3, the retard angle control basic increase amount Rtable (KPLS[Cyl]) is set to be larger in accordance with the increasing number of knock detection pulses KPLS[Cyl].

Although in FIG. 2, both of correction coefficient division processing for adjusting the threshold BGN (step S3) and correction coefficient multiplication processing for adjusting the required amount of correction with respect to each control parameter (step S6) are used at the same time, either one of these adjustment processings may be used. For example, if the step S3 is used singularly or independently of the other, the division processing in step S6 can be omitted, whereas if the step S6 is used singularly, the multiplication processing in step S3 can be omitted.

By executing the above-mentioned calculation processing (steps S1 through S7) at each ignition cycle, the retard angle control increase amount RINC[Cyl] can be obtained.

Then, the noise avoidance processing section 14 executes noise avoidance processing (to be described later together with FIG. 4) (step S8).

Finally, the control parameter correction section 11 adds the retard angle control increase amount RINC[Cyl] to the last retard angle control amount RTD[Cyl](n−1) for each cylinder, and correctively calculates a retard angle control amount RTD[Cyl] to be finally reflected on the ignition timing, as shown in the following expression (5) (step S9), after which the processing routine of FIG. 2 is terminated and exited.

$$RTD[Cyl]=RTD[Cyl](n-1)+RINC[Cyl] \quad (5)$$

In this regard, note that the control parameter correction section 11 applies the decreasing control of retard angle control amount RTD[Cyl] or like other control at each knock occurrence or at each predetermined time. In addition, only the ignition timing is used here as a parameter to be controlled for execution of knock suppression, but the air fuel ratio of the mixture can also be used as a control parameter.

Next, reference will be made to the noise avoidance processing (step S8) in FIG. 2 while referring to a flow chart in FIG. 4 and an explanatory view in FIG. 5.

Figure 4:
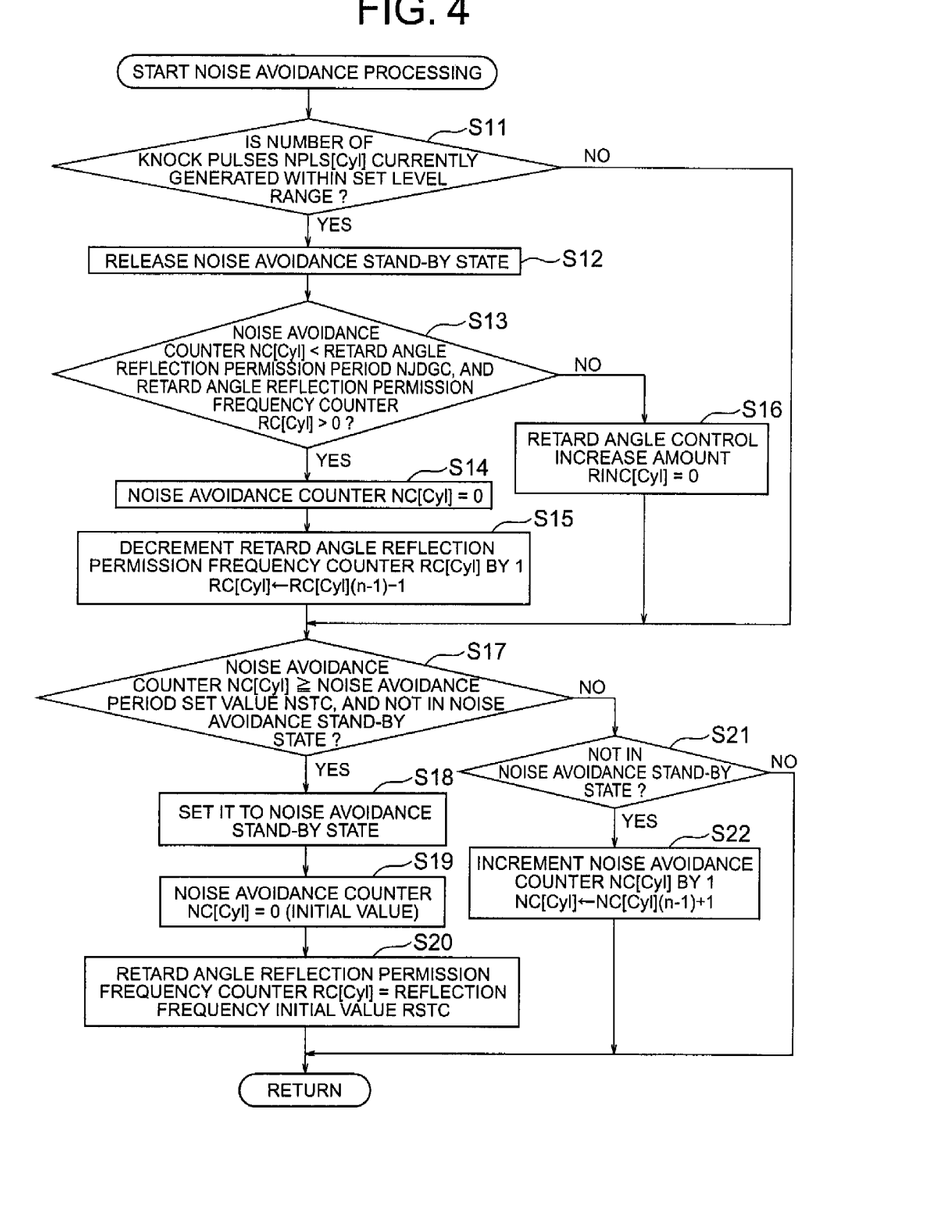
FIG. 4 is a flow chart illustrating a noise avoidance processing operation according to the first embodiment of the present invention.

Here, note that step S11 in FIG. 4 corresponds to the processing of the noise determination section 12, and steps S12 through S22 correspond to the processing of the noise removal period setting section 13.

In addition, the processing of FIG. 4 (step S8 in FIG. 1) may be executed only within a predetermined range of the number of revolutions per minute of the engine.

Here, there is shown the case where the noise determination section 12 makes a noise determination based on the knock pulse (the number of input pulses NPLS[Cyl]) from the knock detection section 6, but the noise determination section 12 can perform a noise determination based on at least one of the knock pulse from the knock detection section 6 and the control parameter correction amount in the control parameter correction section 11, as previously stated.

In FIG. 4, first of all, the noise determination section 12 in the noise avoidance processing section 14 compares the current number of input pulses NPLS[Cyl] from the knock detection section 6 with a noise setting level upper limit value NH[RTD[Cyl]] and a noise setting level lower limit value NL[RTD[Cyl]], respectively, and determines whether the current number of input pulses NPLS[Cyl] is within a set level range between the noise setting level upper limit value NH [RTD[Cyl]] and the noise setting level lower limit value NL[RTD[Cyl]] (step S11).

When it is determined in step S11 that the number of input pulses NPLS[Cyl] is within the set level range and a relation of NH[RTD[Cyl]]≧NPLS[Cyl]≧ NL[RTD[Cyl]] is satisfied (that is, YES), the noise determination section 12 assumes that the engine is in a noise generation state, and releases the noise avoidance stand-by state of the noise removal period setting section 13 (step S12).

When it is determined in step S11 that the number of input pulses NPLS[Cyl] is outside the set level range and a relation of NH[RTD[Cyl]]<NPLS[Cyl] or NPLS[Cyl]<NL[RTD[Cyl]] is satisfied (that is, NO), the noise determination section 12 assumes that the engine is not in a noise generation state, and the noise removal period setting section 13 proceeds to the following determination processing (step S17) without executing the processing in steps S12 through S16.

Here, it is found that noise of the same vibration component as a knock frequency might sometimes be superposed on the ionic current i, depending upon the operating state of the internal combustion engine, in spite of the non-occurrence of a knock, as stated above, and that in some engines, the pressure in a cylinder is sometimes caused to pulsate without regard to the presence or absence of the occurrence of a knock, so a vibration component might be superposed on the waveform of an ionic current i in accordance with the generation of such pressure pulsation.

Further, it is also experimentally known that the above-mentioned noise due to the pressure pulsation is increased in both the frequency of occurrence of noise and the amplitude strength of vibration (i.e., the number of knock pulses is increased) by setting the ignition timing to a retard angle side (i.e., by setting the air fuel ratio to a rich side).

Accordingly, it is found that a high noise avoidance effect can be obtained by increasing, within the set level range in step S11, the noise setting level upper limit value NH[RTD[Cyl]] and the noise setting level lower limit value NL[RTD[Cyl]] with respect to at least one of the increase of the ignition timing retard angle control amount RTD[Cyl] and the enriching of fuel.

On the other hand, regarding knocking, the occurrence of knocks can be suppressed with respect to the increase of the retard angle control amount RTD[Cyl], and the frequency of knock occurrences and the amplitude strength of vibration are decreased, so an increase in the noise setting level upper and lower limit values cause no impediment to the knock suppression.

Figure 5:
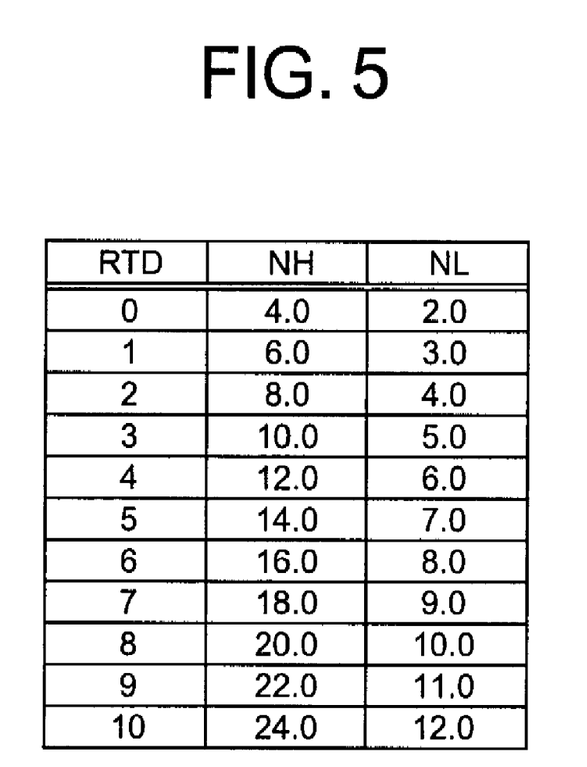
FIG. 5 is an explanatory view showing the conversion table values of noise setting level upper and lower limit values with respect to retard angle control amounts in the first embodiment of the present invention.

FIG. 5 is an explanatory view that shows conversion table values within the set level range in step S11, wherein setting examples of the noise setting level upper and lower limit values NH[RTD[Cyl]] and NL[RTD[Cyl]] with respect to the retard angle control amount RTD[Cyl].

Since it is considered that the frequency of occurrence and the amplitude strength of vibration of noise, which has the same frequency component as the knock frequency, vary depending upon the operating state of the internal combustion engine, the noise setting level upper limit value NH[Rev, Load] and the noise setting level lower limit value NL[Rev, Load] are acquired by map values that are set for each of the number of engine revolutions per minute (Rev) and the load (Load), and those values which are obtained by adding the noise setting level upper limit value NH[RTD[Cyl]] and the noise setting level lower limit value NL[RTD[Cyl]] to the noise setting level upper and lower limit values NH[Rev, Load], NL[Rev, Load], respectively, may be used as the final noise setting level upper and lower limit values, respectively.

Reverting to FIG. 4, after releasing a noise avoidance processing stand-by state in step S12, the noise removal period setting section 13 determines whether a noise avoidance counter NC[Cyl] is less than a retard angle reflection permission period NJDGC, and at the same time determines whether a retard angle reflection permission frequency counter RC[Cyl] is larger than "0" (step S13).

Here, let us assume that the retard angle reflection permission period NJDGC is set to "10", and for the first time of starting noise avoidance processing, the noise avoidance counter NC[Cyl] is set to "0", and the retard angle reflection permission frequency counter RC[Cyl] is set to "3".

Accordingly, for the first time of starting the noise avoidance processing, the noise removal period setting section 13 determines as NC[Cyl]<NJDGC and [Cyl]>0 RC in step S13 (that is, YES), and subsequently clears the noise avoidance counter NC[Cyl] to "0" (step S14) and decrements the retard angle reflection permission frequency counter RC[Cyl] by one to "2" (step S15), after which it proceeds to step S17.

On the other hand, when it is determined as NC[Cyl]≧2 NJDGC or RC[Cyl]=0 in step S13 (that is, NO), the noise removal period setting section 13 assumes that the retard angle control increase amount RINC[Cyl] set in step S6 in FIG. 2 is due to noise, and sets the retard angle control increase amount RINC[Cyl] to "0" (step S16), after which it proceeds to step S17.

At this time, in step S13, the retard angle reflection permission period NJDGC is set to "10", and the retard angle reflection permission frequency counter RC[Cyl] is set to the initial value of "3", so even in an operating state in which knocks occur in succession, the initially set value (=3) of the retard angle reflection permission frequency counter RC[Cyl] is reflected without fail in a retard angle manner within the set value (=10 cycles) of the retard angle reflection permission period NJDGC.

Although in the example of FIG. 4, the retard angle reflection permission period NJDGC is set to 10 cycles, and the retard angle reflection permission frequency counter RC[Cyl] is set to 3 times, these individual values may instead be set to required minimum values which can provide a sufficient retard angle control increase amount RINC[Cyl] against the successive occurrence of knocks. As a result, it is possible to avoid noise which occurs sporadically at high frequencies (e.g., once or more every 10 cycles), unlike knocks, thereby making is possible to suppress the occurrence of successive knocks.

Reverting to FIG. 4, in step S17, the noise removal period setting section 13 determines whether the noise avoidance counter NC[Cyl] is more than or equal to a noise avoidance period set value NSTC, and at the same time, determines whether it is not in a noise avoidance stand-by state. Here, it is assumed that the noise avoidance period set value NSTC is set to "50".

When in step S17 it is determined as NC[Cyl]≧NSTC (=50) and that the noise avoidance stand-by state is released (that is, YES), the noise removal period setting section 13 is set to a noise avoidance stand-by state (step S18).

Subsequently, the noise removal period setting section 13 clears the noise avoidance counter NC[Cyl] to "0" (step S19), and sets the retard angle reflection permission frequency counter RC[Cyl] to a reflection frequency initial value RSTC (e.g., "3" in this example) (step S20), after which the processing routine of FIG. 4 is terminated and exited.

On the other hand, when it is determined in step S17 as NC[Cyl]<NSTC (=50) or that the noise removal period setting section 13 is in a noise avoidance stand-by state (that is, NO), the noise removal period setting section 13 subsequently determines whether the current state thereof is not a noise avoidance stand-by state (NC[Cyl]<NSTC) (step S21).

When it is determined in step S21 that the current state is a noise avoidance stand-by state (that is, NO), the processing routine of FIG. 4 is terminated without executing step S22, whereas when it is determined in step S21 that the current state is not a noise avoidance stand-by state (that is, YES), the noise removal period setting section 13 increments the noise avoidance counter NC[Cyl] by one (step S22), and then terminates and exits the processing routine of FIG. 4.

As described above, according to the first embodiment of the present invention, provision is made for the noise avoidance processing section 14 having the noise determination section 12 and the noise removal period setting section 13, and the noise removal period setting section 13 sets the noise removal period based on the determination result of the noise determination section 12. In addition, the noise removal period timer is started when it is determined that at least one of the knock detection signal and the control parameter correction amount is within the set level range, and correction processing of the control parameter correction section is inhibited for a period of time in which the timer value of the noise removal period timer is smaller than the predetermined value, but the correction processing is permitted when the timer value reaches the predetermined value.

As a result, an incorrect determination of the occurrence of knocks can be avoided even in a condition where the pulsation noise of the cylinder internal pressure in the internal combustion engine is generated, so retard angle correction of the ignition timing based on the incorrect determination of knocks is not performed, thus preventing falling into a vicious circle in which noise is further increased.

Moreover, it is possible to prevent the trouble or inconvenience of keeping correcting the ignition timing to a retard angle based on the incorrect determination thereby to cause the reduction in the output power of the internal combustion engine, and in addition, it is also possible to suppress the occurrence of successive knocks, thus making it possible to improve knock controllability.

Further, the noise determination section 12 variably sets the set level range for noise determination in accordance with the control parameter correction amount in the control parameter correction section 11, so the state of noise occurrence can be determined accurately based on the appropriate set level range.

Furthermore, the noise removal period setting section 13 permits, after start of the noise removal period timer, correction processing of the control parameter correction section 11 over the predetermined number of times within the predetermined time after the timer value reaches the predetermined value, whereby the occurrence of knocks can be suppressed in a reliable manner.

In addition, when at least one of the knock detection signal and the control parameter correction amount deviates from the set level range after start of the noise removal period timer, the noise removal period setting section 13 permits the correction processing of the control parameter correction section 11 regardless of the timer value, so the occurrence of knocks can also be suppressed in a reliable manner.

Embodiment 2

Although in the above-mentioned first embodiment, the noise determination section 12 determines whether the number of input pulses NPLS[Cyl] from the knock detection section 6 is within the set level range, the knock detection signal used for noise determination is not limited to the number of input pulses NPLS[Cyl].

For example, the integral value or the peak value at each ignition of a knock signal output from the band-pass filter 4 may be used as a knock detection signal, or an ionic current signal or a knock signal output from the current-voltage conversion circuit 3, being subjected to an FFT calculation, may be used as a knock detection signal, and in these cases, it may be determined whether those values are within the set level range.

In addition, it may be determined whether the retard angle control increase amount RINC[Cyl], which is one of control parameter required correction amounts set in steps S5 through S7 in FIG. 2, is within the set level range.

Moreover, the retard angle reflection permission period NJDGC, the noise avoidance period set value NSTC and the reflection frequency initial value RSTC in steps S13, S17 and S20, respectively, in FIG. 4 may be acquired by map values which are set for each of the number of engine revolutions per minute (Rev) and the load (Load), so that they may be set to optimal values in each operating condition.

Further, the noise avoidance counter NC[Cyl] in step S13 in FIG. 4 is not limited to the number of ignition cycles but may be handled as a time.

Furthermore, if the internal combustion engine is mounted as for the knock control apparatuses for an internal combustion engine according to the first and second embodiments of the present invention are not limited to application to motor vehicles, but can be applied to other special machines such as motorcycles, outboard machines, etc., on which an internal combustion engine can be installed, and in these cases, it is possible to make use of them for environmental protection through improvements in operation efficiency, reduction in emissions, etc., of the internal combustion engine thus installed.

While the invention has been described in terms of a preferred embodiment, those skilled in the art will recognize that the invention can be practiced with modifications within the spirit and scope of the appended claims.

What is claimed is:

1. A knock control apparatus for an internal combustion engine comprising:
    a knock detection section that evaluates an ionic current generated upon combustion of a mixture around a spark plug of the internal combustion engine and outputs a knock detection signal;
    a threshold setting section that sets a knock determination threshold for said knock detection signal;
    a knock determination section that determines the presence or absence of a knock based on said threshold and said knock detection signal;
    a required correction amount setting section that sets an amount of correction for a control parameter including at least ignition timing based on a determination result of said knock determination section;
    a control parameter correction section that sets a control parameter correction amount based on said required correction amount and corrects said control parameter;
    a noise determination section that determines the presence or absence of noise based on whether at least one of said knock detection signal and said control parameter correction amount is within a set level range; and
    a noise removal period setting section that sets a noise removal period based on a determination result of said noise determination section;
    wherein said noise removal period setting section starts a noise removal period timer when it is determined that at least one of said knock detection signal and said control parameter correction amount is within said set level range; and
    said noise removal period setting section inhibits correction processing of said control parameter correction section for a period of time in which a timer value of said noise removal period timer is less than a predetermined value, and permits said correction processing when said timer value reaches said predetermined value.

2. The knock control apparatus for an internal combustion engine as set forth in claim 1,
    wherein said noise determination section variably sets said set level range in accordance with said control parameter correction amount.

3. The knock control apparatus for an internal combustion engine as set forth in claim 1,
wherein said noise removal period setting section permits, after start of said noise removal period timer, the correction processing of said control parameter correction section over a predetermined number of times within a predetermined time after said timer value reaches said predetermined value.

4. The knock control apparatus for an internal combustion engine as set forth in claim 1, wherein when at least one of said knock detection signal and said control parameter correction amount deviates from said set level range after start of said noise removal period timer, said noise removal period setting section permits the correction processing of said control parameter correction section regardless of said timer value.

* * * * *